United States Patent [19]

Mueller

[11] Patent Number: 4,952,673
[45] Date of Patent: Aug. 28, 1990

[54] PURIFICATION OF COPOLYMERS OF TETRAHYDROFURAN AND ALKENE OXIDES

[75] Inventor: Herbert Mueller, Frankenthal, Fed. Rep. of Germany

[73] Assignee: BASF Aktiengesellschaft, Ludwigshafen, Fed. Rep. of Germany

[21] Appl. No.: 226,688

[22] Filed: Aug. 1, 1988

[30] Foreign Application Priority Data

Aug. 1, 1987 [DE] Fed. Rep. of Germany ....... 3725577

[51] Int. Cl.$^5$ .............................................. C08G 65/20
[52] U.S. Cl. ................................... 528/483; 528/417; 568/617; 568/621
[58] Field of Search ................ 528/417, 483; 568/617, 568/621

[56] References Cited

U.S. PATENT DOCUMENTS

| | | |
|---|---|---|
| 4,127,513 | 11/1978 | Bellis . |
| 4,228,272 | 10/1980 | DelPesco . |
| 4,251,654 | 2/1981 | Robinson . |
| 4,306,058 | 12/1981 | Copelin . |
| 4,480,124 | 10/1984 | Mueller ............................ 568/621 X |
| 4,500,705 | 2/1985 | Copelin . |
| 4,564,671 | 1/1986 | Mueller . |
| 4,585,592 | 4/1986 | Mueller ............................ 568/621 X |

FOREIGN PATENT DOCUMENTS

| | | |
|---|---|---|
| 006107 | 11/1983 | European Pat. Off. . |
| 3346136 | 7/1985 | Fed. Rep. of Germany . |
| 53-46905 | of 1978 | Japan . |
| 53-46906 | of 1978 | Japan . |
| 710842 | 6/1954 | United Kingdom . |
| 1019166 | 2/1966 | United Kingdom . |
| 1566770 | 5/1980 | United Kingdom . |

*Primary Examiner*—Earl Nielsen
*Attorney, Agent, or Firm*—John H. Shurtleff

[57] ABSTRACT

A process for the purification of the polyetherdiols obtained by copolymerization of tetrahydrofuran and 1-alkene oxides by catalytic hydrogenation at temperatures up to 250° C.

9 Claims, 1 Drawing Sheet

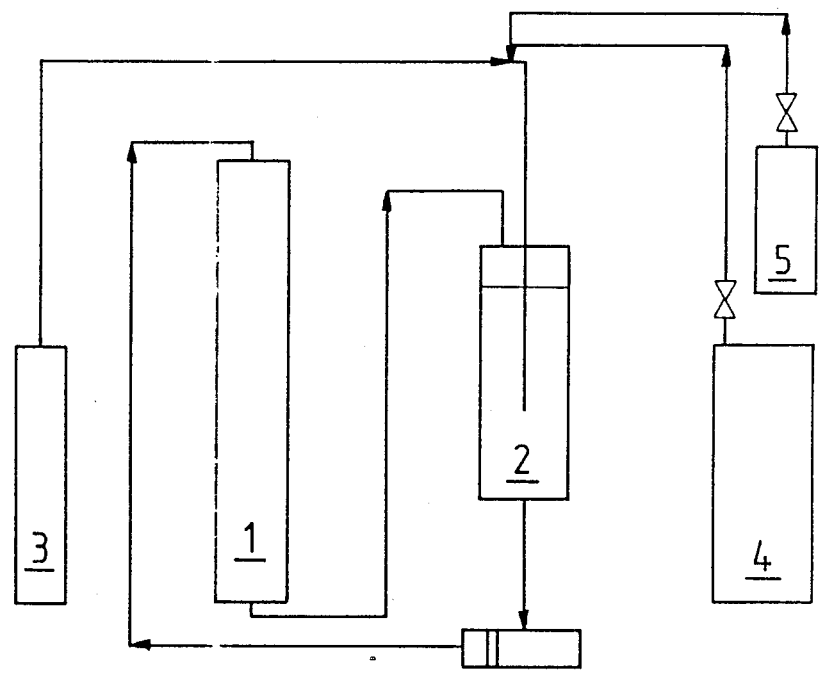

PURIFICATION OF COPOLYMERS OF TETRAHYDROFURAN AND ALKENE OXIDES

The present invention relates to a process for the purification of poly[tetrahydrofuranco(alkene oxides)], polymers that are obtained by the cationically catalyzed copolymerization of tetrahydrofuran and alkene oxides.

Copolymers of tetrahydrofuran and alkene oxides are obtained with the help of cationic catalysts, for instance by the processes described in British Patent 854 958 or U.S. Pat. Nos. 4,139,567, 4,153,786, and 4,329,445. They are important as, for example, starting materials for the manufacture of polyurethans, polyethers, and polyetheramides.

Various impurities are formed in the cationic polymerization of tetrahydrofuran and alkene oxides, especially oligomeric cyclic ethers made up of tetrahydrofuran and alkene oxide units. The copolymers also contain small proportions of dioxan, 2-methyl-1,3-dioxolan, and carbonyl compounds and traces of residual alkene oxide. Also among the impurities are those substances of unknown structure that cause discoloration and those that increase the acid value.

The last-named impurities have particularly deleterious effects on the properties of the products made from the copolymers, which are polyetherdiols. It is not yet possible to ascribe the color of the end products to specific impurities in the polyetherdiols, but it must be assumed that such a connection exists. It may be that several impurites—possibly acting together—form the root of the trouble.

Copolymers containing from about 7% to 10% of cyclic ethers are used for less demanding purposes, such as the manufacture of polyurethanes (U.S. Pat. Nos. 3,425,999 and 4,071,492). They lower the mechanical level of the polyurethans for which they are used, making it inferior to that of polyurethans made from tetrahydrofuran homopolymers containing no cyclic ethers. The deterioration in the properties of the polyurethans is such as would result from the use of too much plasticizer. Since the cyclic ethers are of low molecular weight they evaporate slowly at higher temperatures or are leached out by water or organic solvents, causing loss of weight and changes in dimensions.

Various processes have already been proposed for reducing the proportion of oligomeric cyclic ethers in the copolymers. EP-A 6 107 describes the treatment of the copolymers with activated montmorillonite at elevated temperatures; this process, which involves the troublesome degradation of the oligomeric cyclic ethers in the presence of the required polymer, does not give quantitative removal of the cyclic ethers. U.S. Pat. No. 4,127,513 recommends polymerizing tetrahydrofuran and alkene oxides over acid-activated montmorillonite; the disadvantages of this process are the color of the polymer, the relatively slow rate of polymerization, and the proportion of oligomeric cyclic ethers, which is still from 5% to 6%. According to U.S. Pat. No. 4,228,272 the color is reduced and the rate of polymerization is increased if tetrahydrofuran and alkene oxides are polymerized under the catalytic influence of activated fullers' earth; in practice however the results obtained are not sufficiently good. In other processes (U.S. Pat. Nos. 4,500,705, 4,251,654, and 4,306,058) the cyclic ethers are removed from the polymer by extraction with hydrocarbons, water, or gases in the supercritical state.

In the process described in DE-OS 3 346 136 formation of oligomeric cyclic ethers during the polymerization of tetrahydrofuran and alkene oxides is kept to a mass fraction below 2% by polymerizing continuously in a reactor, recirculating the reaction mixture, and feeding not more than 30% by weight of fresh tetrahydrofuran and 1-alkene oxide into the recirculated mixture. The disadvantage of this process is that the polymer formed is very markedly polydisperse: the heterogeneity quotient $M_w/M_n$ is greater than 4.

It is an aim of the present invention to remove as much as possible of the side products present in copolymers of tetrahydrofuran and alkene oxides. The traces of alkene oxides remaining in the copolymers should also be removed as reliably and completely as possible, since these compounds belong to a class of substances that have proved to be carcinogenic. Since an increased acid value has an undesirable effect on reactivity when the copolymer combines with isocyanates, and for some purposes the color should not exceed a certain maximum, it is equally desirable that the impurities responsible for acidity and color, whose nature is unknown, should be removed as far as possible.

We have found that these aims are met by catalytic hydrogenation at temperatures up to 250° C. of the polyetherdiols obtained by copolymerization of tetrahydrofuran and alkene oxides.

Surprisingly, the novel purification process removes the various side products present in copolymers of tetrahydrofuran and alkene oxides so thoroughly that it is not necessary to subject the copolymers to the usual aftertreatments designed to reduce the proportion of oligomeric cyclic ethers and to remove color.

Other polymers have been subjected to hydrogenation treatment. According to Japanese Laid-open Applications 78/46905 and 78/46906 epoxide polymers and products made from them by treatment with organic halogen compounds in the presence of alkali are hydrogenated catalytically. British Patent 710 842 discloses that polyglycols formed by anionic polymerization can be hydrogenated catalytically, but this known process could not lead one to expect the advantageous results of the novel process: it can be assumed that the impurities formed from colorless momomers in the anionic polymerization are of a kind different from those resulting from the cationic copolymerizaton of tetrahydrofuran and alkene oxides. The information given in European Patent 61 668 corresponding to U.S. Pat. No. 4,480,124 would also not lead to the novel process: it concerns the decolorization of tetrahydrofuran homopolymers by hydrogenation, whereas the novel hydrogenation process does not change the color of the copolymers—their platinum-cobalt color is low both before and after hydrogenation, from less than 5 to 10.

Polyetherdiols obtained by copolymerization of tetrahydrofuran with 1-alkene oxides such as 1-butene oxide, 2-butene oxide, styrene oxide, epichlorohydrin, and especially ethylene oxide and propylene oxide by known method over a cationic catalyst such as fluorosulfonic acid, ether—boron trifluoride, fullers' earth, and zeolite are purified by the novel process. Since such copolymerizations usually yield crude solutions in which the mass fraction of tetrahydrofuran is from 40% to 75% and that of the polyetherdiol is from 60% to 25% these are preferably used for hydrogenation in accordance with the invention. Particularly good results are achieved if the crude solutions used for catalytic hydrogenation contain from 45% to 70% of tetrahydrofuran and from 30% to 55% of polyetherdiol and are obtained by batch copolymerization of tetrahydrofuran and ethylene oxide over fullers' earth or zeolite as catalyst, the ethylene oxide being fed to the reaction mixture at a rate such that its mass fraction in the mixture does not exceed 2% during the polymerization.

In the novel process hydrogenation is carried out at temperatures up to 250° C., preferably at from 50° C. to 250° C., under normal pressure or elevated pressure up to 300 bar. The advantages of using elevated pressures instead of normal pressure are comparatively slight, and the preferred hydrogen pressure is from 10 bar to 100 bar.

Suitable hydrogenation catalysts are the metals of subgroup 8A, particularly nickel, cobalt, and iron and the noble metals ruthenium, palladium, and platinum, and also copper. The metals can be used in the pure form, as the Raney metals for instance, as mixtures, or, for example, as reduced oxides. Catalysts have proved valuable that consist of the hydrogenating metal on a suitable support, such as alumina, silica, pumice, bentonite, or magnesium silicate. Catalysts that contain the metals iron, cobalt, nickel, or copper are best converted to the active form by reduction with hydrogen before use, but this operation is mostly superfluous in the case of catalysts containing noble metals.

The catalytic hydrogenation is carried out in the usual way. Work is carried out in the liquid phase; fixed-bed catalyst and trickle or rising flow can be used, for instance, but hydrogenation with suspended catalyst can also be carried out very successfully.

In a particularly advantageous way of carrying out the novel process the polyetherdiol is treated with oxygen before being hydrogenated. The treatment is carried out at a temperature of from 20° C. to 150° C., preferably from 20° C. to 50° C., and the ratio of the mass of oxygen to the mass of polyetherdiol is from 0.02% to 0.5%, preferably from 0.05% to 0.3%. This pretreatment is applied to the crude solution of the polyetherdiol in tetrahydrofuran, and it considerably reduces the time required for successful purification by hydrogenation. In place of pure oxygen it is possible to use a gas mixture containing oxygen, for instance air.

The novel purification process removes the impurities from the copolymers that are a disadvantage in subsequent processing. In some cases, in which colored products are formed during polymerization, the product is decolorized, but in most cases the copolymers formed by cationic polymerization are already colorless, though they do have acid values that are too high. The novel treatment preserves the colorlessness but reduces the acid value to zero. This important result was unforeseeable. Equally unforeseeable were the change in the copolymer with respect to properties affecting subsequent processing and the reduction in the proportion of oligomeric cyclic ethers. It is not possible to give a plausible scientific explanation for this behavior.

It is an advantage that the novel purification of the crude copolymers can be carried out successfully under unexpectedly mild conditions. The amount of hydrogen consumed is vanishingly small.

It is also an advantage of the novel process that it makes it possible to carry out the copolymerization of tetrahydrofuran and alkene oxide at higher temperatures than are otherwise usual. The proportion of impurities in the crude copolymer is dependent on the polymerization temperature, among other things: the higher the temperature, the greater the proportion of impurities. However, the success of the novel purification is not affected by the proportion of impurities, and it does not matter if the copolymer that is hydrogenated is only slightly impure or more impure. Since increasing the temperature also increases the rate of polymerization and narrows the molecular-weight distribution of the copolymer, the novel process opens up further technical advantages.

It was certainly not to be expected that particularly advantageous results would be obtained when the copolymer to be hydrogenated was first treated with oxygen, since both homopolymers and copolymers of tetrahydrofuran are regarded as being very sensitive to oxidation. For example, the thermal degradation of poly-tetrahydrofuran at various temperatures, described in Makromol. Chem., 81, 38–50 (1965), is greatly promoted by atmospheric oxygen.

In the following Examples the sizes of the mass units and the volume units are such that the coefficient (mass-/unit)/(volume unit) is the same as the coefficient kilogram/liter.

EXAMPLE 1

Commercially available technical tetrahydrofuran was purified as described in Example 1 of European Patent 3 112.

Fullers' earth sold by Süd-Chemie AG of Munich under the trade name Tonsil Optimum FF was extruded into pellets of diameter from 2 mm to 3 mm and average length 4 mm and dried for 4 h at a temperature of 200° C. under a pressure of 40 mbar. The water content of the pellets as determined by the method of K. Fischer was 0.03% after drying.

Polymerization was carried out in apparatus arranged as shown in the drawing. The jacket-cooled tube reactor (1) of volume 5000 units and height:diameter ratio approximately 10:1 was packed with catalyst pellets. The buffer vessel (2) of volume 7000 units was filled with 5000 mass units of purified tetrahydrofuran, 43 mass units of water, and 20.3 mass units of ethylene oxide from the storage vessels (4), (5), and (3) respectively. This mixture of starting materials was pumped into the catalyst bed in the reactor (1), whose temperature was maintained at from 47° C. to 49° C. When the catalyst bed was covered with fresh feed the same quantity as before through the reactor continuously, the overflow being returned to the buffer vessel. The mass fraction of ethylene oxide in the mixture in the buffer vessel (2) was kept at 0.4% by letting in ethylene oxide from the storage vessel (3) at the rate of 35 mass units/h.

After the reaction had proceeded for 9 h and 315 mass units of ethylene oxide had been admitted the reaction was allowed to continue at the same temperature for another 4 h, the mixture being pumped round at the same rate as before, 12 000 volume units/h. At the end of this time the mass fraction of ethylene oxide in the feed had fallen to zero. The total quantity of ethylene oxide supplied and converted was 355.6 mass units.

The buffer vessel (2) was emptied, 5350 mass units of reaction mixture being removed. This first reaction mixture was discarded.

The buffer vessel was refilled with 5500 mass units of fresh feed consisting of 98.7% tetrahydrofuran, 0.9% water, and 0.4% ethylene oxide, and this feed was pumped through the reactor at the rate of 12 000 volume units/h. The mass function of ethylene oxide in the mixture in the buffer vessel was kept at 0.4% by admitting fresh ethylene oxide at the rate of 35 mass units/h. After 9 h the supply of ethylene oxide was discontinued. The reaction mixture was pumped round at the rate of 12 000 volume units/h for another 4 h, then the reaction mixture in the buffer vessel was taken off.

Again the buffer vessel was refilled with tetrahydrofuran, water, and ethylene oxide as described above, and polymerization was carried out for 9 h, with another 4 h for the finishing process. The reaction mixture obtained was scarcely different from any of the 100 subsequent polymerization batches of the same kind.

The crude copolymer solution obtained as described was colorless (platinum-cobalt color less than 5) and had an acid value of 0.2. The mass fraction of polyetherdiol (molar mass 1260 g/mol) was about 45% and that of tetrahydrofuran was about 55%. The solution also contained 0.038% of residual ethylene oxide, which was determined by gas chromatography because the usual gravimetric method of determination was not sufficiently accurate. The mass fraction of ethylene oxide units in the polymer was 15%.

The crude solution of polyetherdiol was hydrogenated in a rocking autoclave for 10 h at a temperature of 80° C. under a hydrogen pressure of 150 bar in the presence of 3% of Raney nickel. After the catalyst had been filtered off the platinum-cobalt color of the solution was 5 and its acid value 0. The same values were obtained for the copolymer after the tetrahydrofuran had been removed by vacuum distillation, indicating that the substance responsible for the acidity was non-volatile.

If hydrogenation was carried out for only half the time the acid value of the copolymer was reduced only to 0.04. If the crude solution of the copolymer in tetrahydrofuran was first treated at a temperature of 45° C. with 3 l of air per kilogram of copolymer and then hydrogenated for half the time the acid value was reduced to zero.

Cast elastomers were made in the usual way from the copolymer aftertreated by hydrogenation as described in this Example, the chain extender 1,4-butanediol, and methylenedi-p-tolylene diisocyanate, the amounts being in the ratio 1:0.77:1.85. The color designation of the cast elastomers was "1:2:1" in the DIN system.

EXAMPLE 2 (comparison)

The crude solution of copolymer obtained as described in Example 1 was evaporated without previous hydrogenation in a film evaporator at a temperature of 200° C. under normal pressure and pressures down to 1 mbar. The distillate obtained consisted of 98% of tetrahydrofuran and about 2% of oligomers of tetrahydrofuran and ethylene oxide whose mean molar mass was 250 g/mol as determined by cryoscopic measurements or vapor pressure osmometry. The hydroxyl value of the oligomers was only 220, which indicated that they consisted of a mixture of roughly equal parts of cyclic ethers and polyetherdiols, since a diol with a molar mass of 250 g/mol would have a hydroxyl value of 448.8. Capillary gas chromatography showed that the distilled tetrahydrofuran contained about 0.09% of ethylene oxide, 0.06% of 1,4-dioxan, and 0.07% of 2-methyl-1,3-dioxolan.

The comparable distillate from the hydrogenated crude solution of copolymer obtained as described in Example 1 contained about 1.8% of oligomers of tetrahydrofuran and ethylene oxide. The mean molar mass of these oligomers was 260 g/mol as determined by cryoscopic, vapor pressure, or osmometric methods, and the hydroxyl value was 510. The distillate contained less than 0.01% dioxan and dioxolan, and ethylene oxide was not detected.

From the copolymer obtained as described in this Example cast elastomers were made in the way described in the last paragraph of Example 1. Their color was deeper than that of the elastomers described in Example 1, the color designation in the DIN system being "1:5:1".

EXAMPLE 3

Crude polyetherdiol solution obtained as described in Example 1 was hydrogenated in a continuous process.

The composition of the catalyst before activation was 24% nickel oxide, 8% copper oxide, and 68% silica, and the mixture was in the form of cylindrical pellets 3 mm high and 3 mm in diameter. A reactor whose height-to-diameter ratio was 58:1 was packed with 700 volume units of the pellets, which were then activated before use in the usual way at a temperature of 200° C. under hydrogen at a pressure of 50 bar.

The crude copolymer solution was hydrogenated at a temperature of 150° C. under a total pressure of 250 bar by the rising flow method. The mean contact time of the polymer solution and the catalyst was 4 h. Provided that the contact time was not less than 4 h, the properties of the copolymer obtained by vacuum distillation of the tetrahydrofuran were the same as those of the copolymer obtained after hydrogenation by the method given in Example 1.

The results were similar when the catalyst consisted of copper and cobalt prepared as described in Example 21 of German Laid-Open Application 2 726 710, the composition corresponding approximately to CuO-$\frac{1}{2}Co_2O_3$-$SiO_2$. Similar results were also obtained with 0.5% palladium supported on 3-mm silica-gel rod when the hydrogenation was carried out at a temperature of 110° C. under a hydrogen pressure of 100 bar.

EXAMPLE 4

The crude solution of copolymer in tetrahydrofuran obtained as described in Example 1 was treated at a temperature of 45° C. with 5 l of air per kilogram of copolymer, the air being introduced below the surface while the solution was stirred vigorously. After having been pretreated in this way the solution was purified by hydrogenation over copper-nickel catalyst supported on silica gel at a temperature of 150° C. under a pressure of 250 bar, as described in Example 3. A mean contact time of only 1 h was then sufficient for complete purification.

I claim:

1. A process of purifying the crude solution of a polyetherdiol as obtained by the cationic copolymerization of tetrahydrofuran and 1-alkene oxides, which process comprises:

subjecting said crude solution of said polyetherdiol to a catalytic hydrogenation at temperatures up to 250° C. and for a period of time sufficient to substantially reduce the acidity and the proportion of oligomeric cyclic ethers of said polyetherdiol.

2. A process as claimed in claim 1 wherein said crude solution is obtained by copolymerization of tetrahydrofuran and a 1-alkene oxide over a cationic catalyst, the mass fraction of tetrahydrofuran in said solution being from 40% to 75% and that of the polyetherdiol being from 25% to 60%.

3. A process as claimed in claim 1 wherein said crude solution is obtained by batch copolymerization of tetrahydrofuran and ethylene oxide over fullers' earth or zeolite as catalyst, the ethylene oxide being added to the reaction mixture at a rate such that its mass fraction does not exceed 2% during the polymerization, and wherein the mass fraction of tetrahydrofuran in said crude solution is from 45% to 70% and that of the polyetherdiol is from 30% to 55%.

4. A process as claimed in claim 1 wherein hydrogenation is carried out at temperatures of from 50° C. to 250° C. under pressures of from 10 bar to 100 bar.

5. A process as claimed in claim 1 wherein the catalyst used for hydrogenation is selected from the group consisting of nickel, cobalt, iron, ruthenium, palladium, platinum and copper.

6. A process as claimed in claim 1 wherein the polyetherdiol is treated with oxygen before being hydrogenated, the treatment being carried out at a temperature of from 20° C. to 150° C. and the ratio of the mass of oxygen to the mass of polyetherdiol being from 0.02% to 0.5%.

7. A process as claimed in claim 6, wherein the hydrogenation following said treatment with oxygen is sufficient to reduce the acid value of the purified polyetherdiol to zero.

8. A process as claimed in claim 1, wherein said crude solution to be purified is substantially colorless.

9. A process as claimed in claim 6, wherein said crude solution to be purified is substantially colorless.

* * * * *